UNITED STATES PATENT OFFICE.

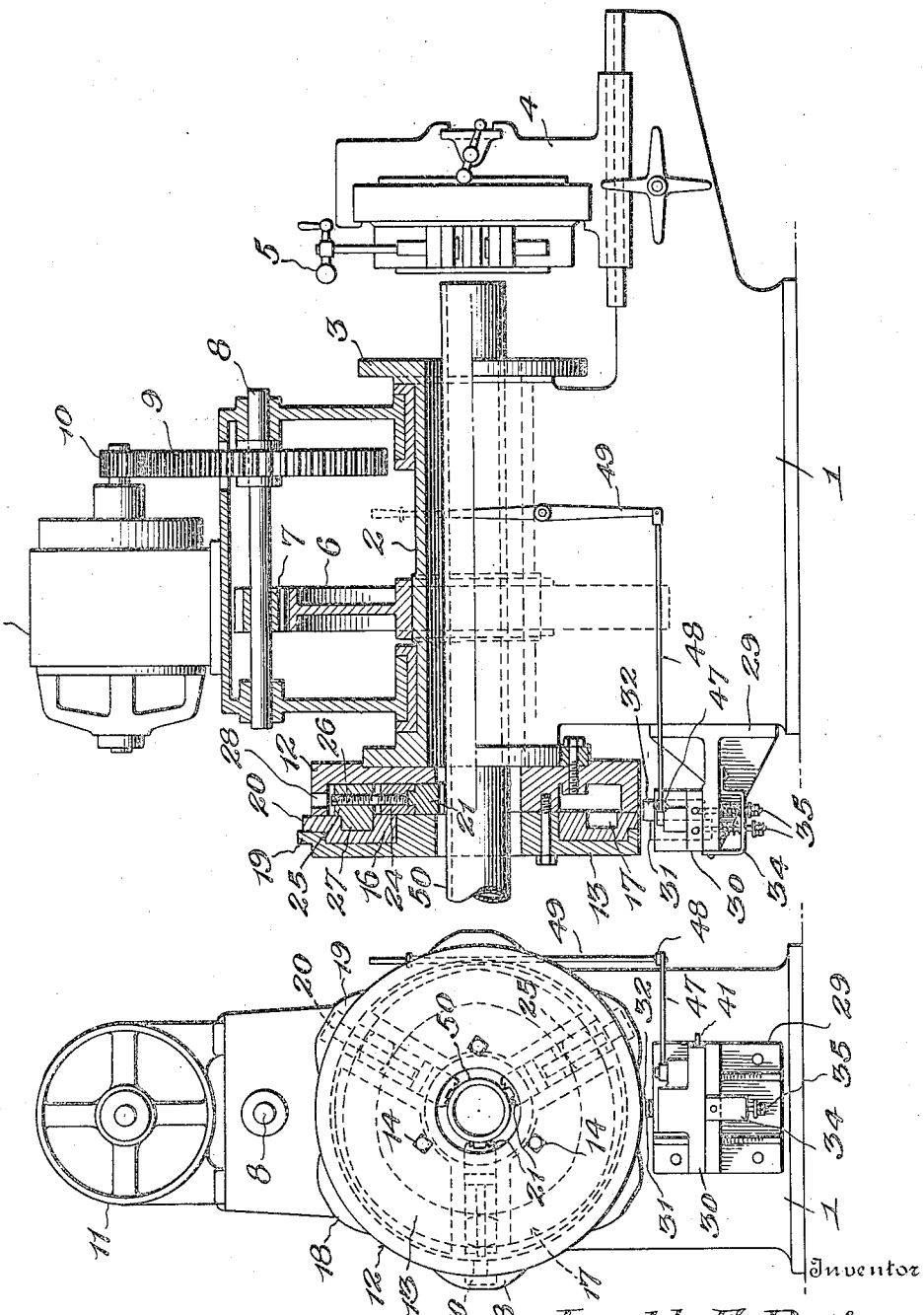

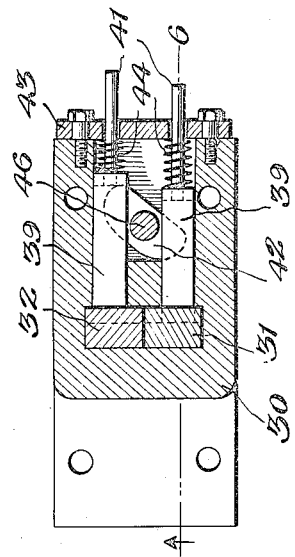

JOSEPH E. BAINES, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

UNIVERSAL CHUCK.

1,295,412.   Specification of Letters Patent.   Patented Feb. 25, 1919.

Application filed June 5, 1917. Serial No. 172,987.

*To all whom it may concern:*

Be it known that I, JOSEPH E. BAINES, a citizen of the United States, and resident of Pittsburgh, in the county of Allegheny and State of Pennsylvania, have invented certain new and useful Improvements in Universal Chucks, of which the following is a specification.

This invention relates particularly to chucks for holding articles, and has for its object to provide a device of this character which, while in motion, may be caused to grip or release the article without necessitating the stopping of the machine to which the chuck is applied, and which is universal in operation for gripping articles required to be rotated either to the right or to the left without changing any part of the chuck, the operation being the same whether the article is rotated in one or the opposite direction.

Another object is the provision of a chuck which may be readily adjusted within certain limits to articles of various sizes so as to grip or release such articles while the chuck is in motion and without the necessity of stopping and starting the machine for this purpose.

Other objects will appear as the details of the invention are disclosed in the following description, reference being had to the accompanying drawings, in which:—

Figure 1 is a rear view of a pipe threading machine provided with a universal chuck embodying the invention.

Fig. 2 is a side view of the machine, a portion of the same and the chuck being in vertical central longitudinal section.

Fig. 3 is a sectional view of the chuck on the line 3—3 of Fig. 4, looking to the left, as indicated by the arrows.

Fig. 4 is a sectional view of the chuck on the line 4—4 of Fig. 3.

Fig. 5 is a horizontal section on the line 5—5 of Fig. 6.

Fig. 6 is a sectional view of the mounting for the trips and the locking means coöperating therewith taken on line 6—6 of Fig. 5.

Fig. 7 is a detail perspective view of a jaw.

Fig. 8 is a detail perspective view of one member of the jaw-carrier.

Fig. 9 is a detail perspective view of the remaining member of the jaw-carrier.

The pipe threading machine illustrated comprises a frame 1, upon which is slidably mounted a thread cutting mechanism in the manner well understood. A barrel 2 is mounted upon the frame 1 and is provided at its ends with flanges 3 arranged to engage the ends of the bearing and prevent any longitudinal movement of the barrel when the machine is in operation.

The thread cutting mechanism may be of any desired construction usually employed for cutting threads upon pipe, and, as shown, the same comprises a frame 4 which is slidably mounted upon the frame 1 and provided with threading dies in a manner well understood, adapted to be operated by means of a screw 5 so as to separate the chasers or threading dies to clear the work and to move the dies together into thread cutting position when it is required to engage the work to form screw threads thereon in the manner well understood. The threading mechanism is adapted to be reciprocated upon the frame 1 by any suitable mechanism whereby the dies may be advanced to engage the work or moved away from the work after the thread has been cut.

In the present instance, the barrel 2 has a spur gear wheel 6 fastened thereto in any manner, and this spur gear is in mesh with a spur pinion 7 secured to a shaft 8 mounted upon the frame 1 parallel with the axis of the barrel 2. A spur gear 9 secured to the shaft 8 is in mesh with a pinion 10 fastened to the shaft of a driving motor 11, which, as indicated, is of the electric type. In this connection, it is to be understood that the barrel 2 may be driven from any suitable source of power in any desired way. In order to illustrate the application of the invention, a work holding chuck is secured to the barrel 2 for rotation therewith, and this chuck may be of any form or size, depending upon the nature of the work.

The chuck illustrated comprises a body 12 and a cap plate 13, the latter being secured to the body 12 in any manner, as by means of fastenings 14. A plurality of recesses 15 are formed in the body 12 and have a radial disposition and are designed to receive the jaws and jaw-carriers which are slidably mounted therein. The number of recesses 15 will depend upon the number of jaws embodied in the chuck. In the form shown in the accompanying drawings and illustrated more particularly in Fig. 3, three recesses 15 are provided, each receiving a jaw and a jaw-carrier.

A plate 16 is disposed between the body 12 and cap-plate 13 and is constructed to receive a rotary movement. In the form shown, the plate 16 is of an annular structure and is provided upon its innermost face with a groove 17 which is of such form as to provide a plurality of cams which are adapted to positively actuate the jaws to effect a radial reciprocatory movement thereof. The cam groove 17 has three portions equidistant and at a maximum distance from the axis of the chuck and these points correspond with the recesses 15, as indicated most clearly in Fig. 3. The cam groove 17 likewise has three portions equidistant and at a minimum distance from the center or axis of the chuck, and these points are midway between the radial recesses 15 and are indicated at 17$^a$ in Fig. 3. The portions of the cam groove 17, upon opposite sides of the points 17$^a$, gradually and symmetrically approach the recesses 15, and these cam portions alternately act upon the jaws to move them outward from the work when it is required to release the same and to again move the jaws inward to grip the work. The actuation of the jaws is automatic in each direction; hence, the work may be released or gripped without requiring the machine to be stopped. Double-ended cams 18 are provided upon the body 12 of the chuck in line with the recesses 15 and are disposed adjacent the inner face of the plate 16. Other double-ended cams 19 are disposed intermediate of the cams 18 and are carried by the cap-plate 13 and are disposed adjacent the outer face of the plate 16. The plate 16 is provided with outwardly-extending lugs 20, one for each of the recesses 15 and in line therewith. The double-ended cams 18 and 19 project outwardly from the body of the chuck beyond the lugs 20, the lugs 20 terminating within the outer edges of the cams 18 and 19 to admit of such cams acting upon the trips to clear them from the lugs 20 in the operation of the machine.

The jaws 21 for gripping the work may be of any construction and are detachably connected with carriers to admit of replacement when desired. Each of the jaws is formed with a dove-tail tenon 22 which is adapted to engage a corresponding mortise 23 in a member 24 of the carrier. The carrier for each of the jaws comprises the member 24 and a member 25, each of such members consisting of a block. The members or blocks 24 and 25 are adjustably connected whereby provision is had for adjusting the jaws when adapting the chuck to the size of the work to be held thereby. The members or blocks 24 and 25 are connected by means of screws 26, and these screws have end portions formed with right and left hand threads, thereby admitting of a comparatively quick adjustment of the jaws by a relatively small rotary movement of the screws. The members or blocks 25 occupy a given position and the members or blocks 24 are adjustable, and this is necessary because the blocks or members 25 occupy a given relative position to the cam groove 17 with which they are in engagement. Each block or member 25 is formed with an upstanding portion 27 which projects into the cam groove 17, as indicated most clearly in Fig. 4. The outer and inner edges of the parts 27 are made rounding to conform to the walls of the cam groove 17 so as to prevent any binding between these parts when the plate 16 is rotated to move the jaws outward or inward. The screws 26 are adapted to be turned by means of a suitable tool, and, as indicated, the outer ends of the screws are formed with a groove to receive the point of a screw-driver which may be introduced through an opening 28 formed in the outer wall of the body 12 in line with the recess 15.

From the foregoing, reference being had to the drawings, it will be readily understood that rotation of the plate 16 with reference to the body of the chuck effects movement of the jaws, both outwardly to release the work and inwardly to grip the work. When the plate 16 occupies a position with reference to the body of the chuck so that the three portions of the cam groove 17, at a maximum distance from the center of the chuck are in line with the recess 15, the jaws 21 are moved outward to their greatest throw, thereby releasing the work. When the plate 16 is moved so as to bring the portions 17$^a$ of the cam groove 17 in line with the recesses 15, the jaws 21 are moved inward to the limit of their throw toward the center and grip the work. It is assumed that the jaws 21 have been adjusted so as to firmly grip the work when the plate 16 occupies a position with the portions 17$^a$ of the cam groove in line with the recesses 15. It is further observed that movement of the plate 16 in either direction to carry the portions 17$^a$ of the cam groove away from the recess 15 will move the jaws 21 outward and release the work. Again, movement of the plate 16 in either direction to carry the portions 17$^a$ of the cam groove toward the recesses 15, advances the jaws 21 so as to grip the work. It will thus be understood that the chuck may be used for right or left-hand work and is of universal application and equally well adapted for machines cutting right or left screw threads.

In the construction illustrated, the chuck being secured to the barrel 2, is rotated continuously with such barrel in the same direction; hence, a relative rotary movement of the plate 16 is effected by a momentary stoppage of such plate, and this is accomplished by the mechanism now to be described.

A bracket 29 is secured to or may form a part of the main frame 1 and receives a body 30 which may be secured thereto in any manner. Trips 31 and 32 are slidably mounted in openings formed in the body 30 and are adapted to be projected into the path of the lugs 20 and double-ended cams 18 and 19. The trips 31 and 32 are of like formation and are disposed side by side. The trip 31 is adapted to be projected into the path of the double-ended cams 19 and the lugs 20. The trip 32 also is adapted to be projected into the path of the double-ended cams 18 and the lugs 20. The trips 31 and 32 are normally acted upon by means of expansible helical springs 33 which abut at their upper ends against the lower ends of the trips and engage a bracket 34 at their lower ends, such bracket being secured at its ends to the bracket 29. Pins 35 pass through the springs 33 and engage the respective trips 31 and 32. A pair of nuts 36 is mounted upon the lower ends of the pins 35 and permit of adjusting the trips. To deaden the noise incident to engagement of the nuts 36 with the bracket 34, a plurality of washers are mounted upon the pins 35. Each of the pins 35 is provided with a washer 37 of leather or like material and washers 38 of metal, the washer 37 being disposed between the washers 38.

The trips 31 and 32 are held in lowered position against the tension of the springs 33 by means of lock-bolts 39 which are slidably mounted in the body 30 to slide in a direction at a right angle to the movements of the trips 31 and 32. Each of the lock-bolts 39 is formed with a depending portion 40 at its outer end and this depending portion is utilized to receive a pin 41 and to form a shoulder or abutment to be engaged by means of a cam 42. The pins 41 extend through openings formed in a cap-plate 43 secured to a portion of the body 30. Expansible helical springs 44 are mounted upon the pins 41 and are confined between the cap-plate 43 and the outer ends of the lock-bolts 39 and normally tend to press the lock-bolts inward into engagement with the trips. Each of the trips is formed in the side with a notch 45 to receive the inner end of the coöperating lock-bolt 39 whereby the trip is held depressed against the tension of the spring 33.

For operating the lock-bolts 39 to effect their release from the trips, a spindle 46 is mounted in the body 30 and is provided at its lower end with the cam or cross-head 42, and at its upper end with an arm 47. The ends of the cam or cross-head 42 are adapted to engage the depending portion 40 of the lock-bolts. Rotation of the spindle 46 in one direction brings one end of the cam or cross-head 42 into engagement with the depending portion 40 of one of the lock-bolts, thereby releasing one of the trips which is projected into the path of the lugs 20 and one set of double-ended cams 18 or 19. Rotation of the spindle 46 in an opposite direction effects a movement of the remaining lock-bolt so as to release the other trip, which is projected by its spring 33 into the path of the lugs 20 and the other set of double-ended cams. For convenience of operating the spindle 46 a link 48 connects the outer end of the arm 47 with a lever 49, conveniently disposed to be operated by the attendant.

In adapting the chuck for gripping the particular article, it is essential that the plate 16 be moved to a given position, that is with the jaws in line with the portions 17ª of the operating cam. This may be determined by marks of any character upon the plate 16 and the body of the chuck. When the plate 16 or jaw-operating member is thus adjusted, the article to be gripped is placed in position, after which the jaws are set so as to grip the article firmly, this being accomplished by rotation of the screws 26. In the present instance, the article to be gripped is illustrated as a length of pipe 50, such pipe being passed through the barrel 2 with its end projecting to be engaged by the screw thread cutting mechanism. The machine being started, the article or work 50 is rotated with the barrel 2 and chuck, and the screw thread cutting mechanism is advanced so as to engage the projecting end of the pipe and form a screw thread thereon in the manner well understood. After the pipe has been threaded to the required length, the screw cutting dies are released by operating the screw 5 in the manner well understood, and the threading mechanism is backed off or retracted so as to clear the pipe. This operation is well known in the art and does not require a detailed description. The lever 49 is now operated and withdraws the locking bolt 39 from the trip 31, and the latter is projected by the spring 33 into the path of the lugs 20 and cams 19. In the rotation of the chuck, one of the lugs 20 is engaged by the trip 31, and the plate 16 is momentarily held stationary and the body continuing to rotate causes the projecting portions 27 of the jaw-carrying members to ride in the cam portions of the circularly-disposed cam groove 17, with the result that the jaws are moved outward and release the work or article 50. When the body of the chuck reaches a point in its rotation to bring the next cam or releasing projection 19 about in register with the lug 20 in engagement with the trip 31, the latter rides upon the inclined end of the cam projection 19 and is depressed thereby to such an extent as to bring its notch 45 into register with the locking-bolt 39, and the latter being shot forward by means of the spring 44, holds the trip 31 depressed or out of the path of the lug 20, thereby permitting the plate or jaw-operating member 16 to again rotate with the jaw. At this time, the jaws 21 are in retracted position so as to be clear of the article 50 and the latter may be removed and a new pipe placed in position or the same may be reversed to admit of its opposite end being threaded. After the pipe 50 has been placed in position to be again operated upon, the lever 49 is operated to withdraw the remaining lock-bolt 39, with the result that the trip 32 is projected into the path of the lugs 20 and cam projections 18, and when one of the lugs 20 is engaged by the trip 32, the plate or jaw-operating member 16 is momentarily held stationary and the chuck body continuing to rotate causes the projecting parts 27 of the jaw-carriers to ride in the cam portions of the circularly-disposed cam 17 from the recesses 15 to the intermediate portions 17ª, with the result that the jaws are moved inward and closed so as to firmly grip the work. At this instant, the trip 32 is engaged by the next cam projection 18 and is moved clear of the lug 20, and as the trip 32 is depressed, the notch 45 therein is brought to a position to be engaged by the lock-bolt 39, thereby holding such trip clear of the lugs 20 and admitting of the chuck body and member 16 freely rotating.

The helical springs 44 for operating the lock bolts 39 in moving the lock bolts into trip locking position, will move the cam 42 and hand lever 49 into intermediate position, (that shown in Fig. 2). Preferably, however, the lever 49 will be moved manually into its intermediate position immediately after being used to retract one of the lock bolts 39.

It will be understood from the foregoing, taken in connection with the accompanying drawings, that the invention provides a chuck which is practically automatic in operation and universal in application, since it will grip and release the article or work whether the chuck is rotated to the right or to the left without requiring any adjustment or setting of parts. In this connection, it is to be understood that the chuck may embody any number of jaws, depending upon the size of the chuck and the particular work for which the same is designed.

The jaw element comprises the members 24 and 25, the member 24 being provided with a jaw proper and the element 25 constituting the operable element, since it is positively and directly actuated by means of the plate or jaw-operating member 16.

Having thus described the invention, what I claim, is:—

1. A chuck comprising a rotary chuck body having a plurality of radially reciprocating gripping jaws, a jaw operating member on said body, said jaw operating member being rotatable with and relatively to the chuck body, retarding means engaging with the jaw operating member to cause rotative movement of the chuck body relative to the jaw operating member and thereby move the jaws into and out of closed position, means on the chuck body for preventing operative engagement of said retarding means with the jaw operating member when the jaws are in open and in closed position, means for automatically locking said retarding means in inoperative position, and means for manually releasing said locking means.

2. A chuck comprising a rotary chuck body having a plurality of radially reciprocating gripping jaws, a jaw operating member on said body, said jaw operating member being rotatable with and relatively to the chuck body, movable stops adapted to automatically engage with the jaw moving member to cause relative rotative movement of the chuck body and jaw operating member and thereby move the jaws into and out of closed position, means on the chuck body for moving one stop into inoperative position when the jaws are in closed position, means on the chuck body for moving the other stop into inoperative position when the jaws are in open position, and means for locking the stops in inoperative position.

3. A chuck comprising a rotary chuck body having a plurality of radially reciprocating gripping jaws, a jaw operating member on said body, said jaw operating member being rotatable with and relatively to the chuck body, movable stops adapted to automatically engage with the jaw operating member to cause relative rotative movement of the chuck body and jaw operating member and thereby move the jaws into and out of closed position, means on the chuck body for moving one stop into inoperative position when the jaws are in closed position, means on the chuck body for moving the other stop into inoperative position when the jaws are in open position, means for locking the stops in inoperative position, and means for releasing said stops.

4. A chuck comprising a body having two sets of projections disposed equidistant, a jaw carried by the body, and a jaw-operating member rotatably mounted upon the body and having an operable projection to successively register with the projections of the body.

5. A chuck comprising a body having two sets of equidistant projections, a radially-movable jaw carried by the body, and a jaw-operating member rotatably mounted upon the body and having an operable portion about in line with the jaw and provided with a circularly-disposed cam having equidistant portions at a maximum distance from the center of the chuck and intermediate equidistant portions at a minimum distance from the center of the chuck.

6. A chuck comprising a body, a plurality of jaws mounted upon the body and disposed equidistant and having a radial movement, the body of the chuck being provided with two sets of projections disposed equidistant, the number of projections for each set corresponding with the number of jaws, and a jaw-operating member having projections about in line with the jaws and adapted to register in succession with the projections of the body.

7. A chuck comprising a body, radially movable jaws mounted upon the body, the latter having two sets of projections, a jaw-operating member rotatably mounted upon the body and having a circularly-disposed cam having portions disposed equidistant and at a maximum distance from the center of the chuck, and intermediate portions at a minimum distance from the center of the chuck, said cam engaging the jaws, and the jaw-operating member being provided with projections about in line with the jaws and adapted to successively register with the projections of the chuck body.

8. In combination, a chuck body provided with a releasing projection, a jaw, a jaw-operating member having a projection and a trip adapted to be projected into the path of the projections of the jaw-operating member and chuck body.

9. In combination, a body provided with two sets of projections, a jaw carried by the body, a jaw-operating member mounted upon the body and having a projection and two trips, one of such trips being disposed to engage one set of projections of the chuck body and the projection of the jaw-operating member, and the other trip to be projected into the path of the remaining set of projections of the chuck body and the projection of the jaw-operating member.

10. In combination, a body comprising two sets of projections, a plurality of jaws mounted upon the body and adapted to have a radial movement, a jaw-operating member having projections, two trips disposed the one to engage the projections of the jaw-operating member and one set of projections of the body and the other to engage the remaining set of projections of the body and the projections of the jaw-operating member, means normally tending to hold the trips projected, locking means for holding the trips depressed, and controlling means for withdrawing the locking means from the trips.

JOSEPH E. BAINES.

In the presence of—
D. M. LINTON,
W. J. WHITE.